United States Patent Office 3,295,724
Patented Jan. 3, 1967

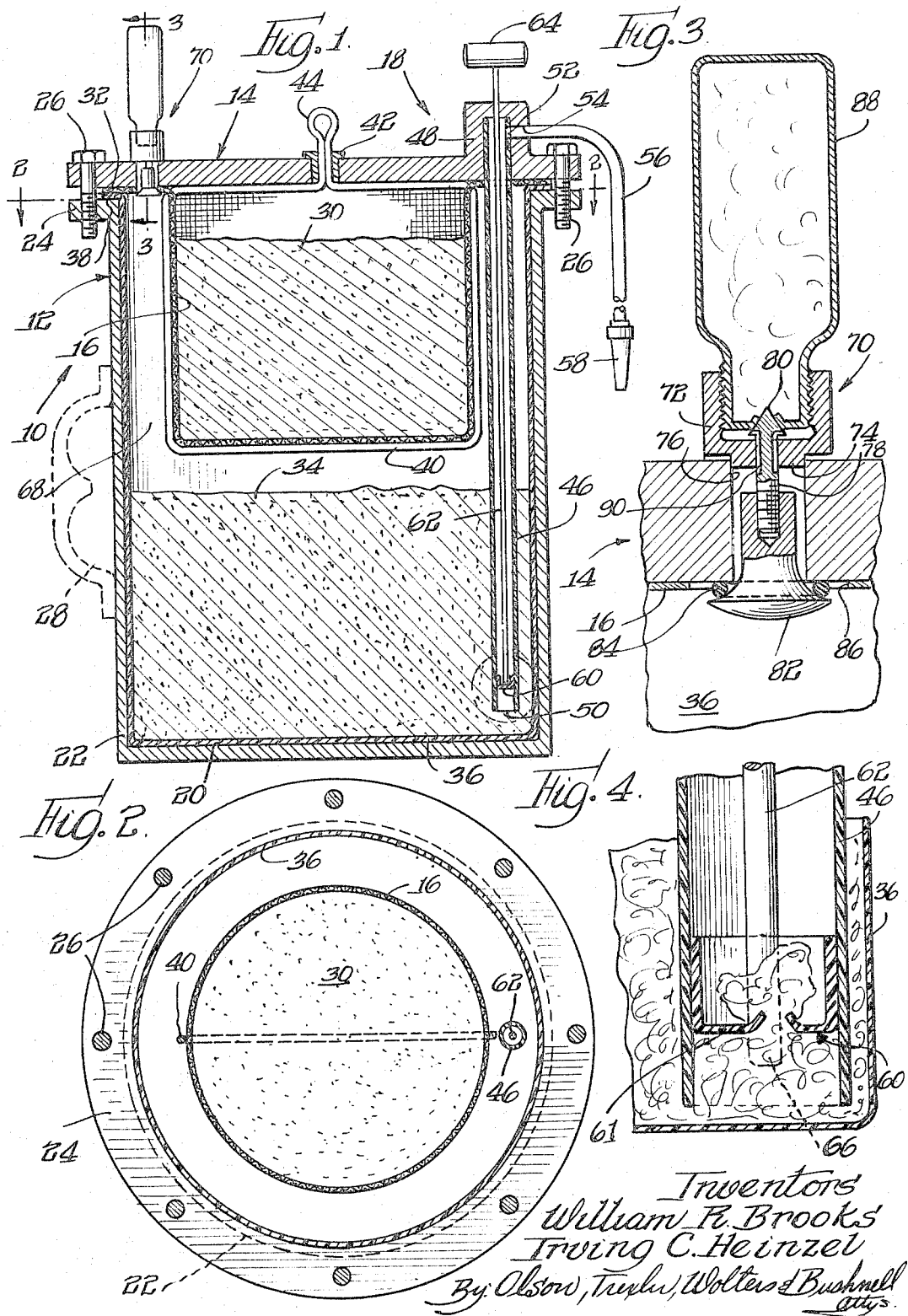

3,295,724
PORTABLE, RECHARGEABLE DISPENSING
UNIT FOR REACTABLE RESINS
William R. Brooks, 365 Alexander, Elmhurst, Ill. 60126, and Irving C. Heinzel, 1111 Webster Lane, Des Plaines, Ill. 60016
Filed Dec. 2, 1964, Ser. No. 415,346
5 Claims. (Cl. 222—80)

This invention relates generally to foamed polymeric materials and relates more particularly to apparatus for dispensing polymeric foams.

The foamed form of such polymeric materials as polyurethane and polystyrene resins has advantageous structural and insulative properties; and maximum utility is achieved when the polymer is foamed into the space where it is ultimately required. The forming of a polymeric foam in the place where it is needed, however, has not always been achievable heretofore, particularly, when a polyurethane resin or other heteropolymer has been involved. In this latter instance, the reactant materials must be kept separate until the time of use; and then they must be mixed in proper proportion and applied quickly while the polymerization takes place and while the blowing agent is active. In the past, these requirements have not always been met without the use of complicated and expensive equipment.

One common prior art scheme has employed separate vessels for containing the diverse reactant materials, and a mixing nozzle has been relied on to achieve a proper proportioning of the materials as well as the dispensing of the resultant mixture. Available designs have not generally produced the degree of flow control that is necessary to accurate proportioning of the reactant materials; and consequently, the target molecular weight in the final polymer has frequently been missed in actual practice. Hence, the theoretically available physical properties have not always been achieved; and the fields of use have thereby been restricted. Moreover, the volumetric bulk of the prior art machines of the described type has excluded them from use in situations where space restrictions have been imposed or where portability is a serious consideration.

Psuedoportable dispensers have also been developed; and while the single vessel of these units has been arranged to keep the reactants separate until the time of use, the need for a source of rotative power for mixing purposes at the time and place of use has prevented these devices from being truly self-contained and portable. Moreover, the nature of these dispensers has precluded nozzle application of the foaming resin.

Therefore, an important object of the present invention is to overcome these defects of the prior art and provide a compact, lightweight, self-contained apparatus for conveniently dispensing a mixture of diverse, reacting materials in accurate proportion and from an easily manipulated nozzle.

A more general object of the invention is to provide a new and improved dispenser system for polymeric foams.

A further object of the invention is to provide a new and improved method of dispensing a reacting mixture.

These and other objects and features of the invention will become more apparent upon a consideration of the following descriptions.

The objects of the invention are achieved by providing a single closed vessel in which pre-weighed reactants of comparatively low viscosity are separated by a rupturable membrane. In addition, means are provided for rupturing the membrane at a selected time to permit mixing of the pre-weighed reactants immediately prior to their being dispensed. When the membrane is arranged in the shape of a container or bag of film material, the rupturing means may take the form of a noose which encircles the bag and which is adapted to be drawn tightly thereabout overstressing the film of the bag for breaking the same. In addition, a dispensing nozzle is connected to the mixing vessel by a flexible hose.

In order that the principles of the invention may be more readily understood, a single embodiment thereof, but to which the application is not to be restricted, is shown in the accompanying drawing wherein:

FIG. 1 is a central sectional view in side elevation of a dispenser constructed in compliance with the principals of the present invention;

FIG. 2 is a top plan view taken substantially along the line 2—2 of FIG. 1;

FIG. 3 is an enlarged, elevational view taken substantially along the line 3—3 of FIG. 1 and showing attachment of the auxiliary gas container; and FIG. 4 is an enlarged, elevational view of that portion of FIG. 1 enclosed in a broken line circle, the manual rod being shown in position rupturing the disc seal.

Referring now in detail to the drawing, specifically to FIG. 1, a portable device for dispensing polymeric foam is indicated generally by the reference numeral 10. The device 10 comprises a vessel body 12, a cover 14, a rupturable membrane 16, and a dispensing arrangement 18. The vessel body 12 is fashioned with a circular floor 20 which defines a closed end, a tubular side wall 22, and a mounting flange 24 which is disposed at the open end of the vessel body for providing a seat to cooperate with the periphery of the cover 14. The vessel body 12 is advantageously fabricated to be of pressure-resistant construction; and in one specific embodiment of the invention, a steel container having a diameter of approximately three inches and a height of approximately ten inches has been usefully employed. Bolts 26 are employed in securely fastening the cover 14 to the vessel body 12; and conveniently, these bolts pass slidably and rotatably through the cover to threadedly engage the mounting flange 24 of the vessel body. If desired, a conventional, annular gasket of suitable material may be interposed between the periphery of the cover 14 and the mounting flange 24 to insure a hermetic seal. In addition, the vessel body may have a handle device 28 secured to the tubular wall 22 to facilitate handling, carrying and manipulation of the dispenser device 10.

The vessel body 12 is intended to contain stoichiometric quantities of two reactant materials, and the rupturable membrane 16 is provided to separate these reactants until their admixture is desired just prior to the dispensing of the contents of the vessel body. In the disclosed embodiment, the membrane 16 is shaped to form a bucket-like container for receiving a quantity of a first reactant 30. Specifically, this container is shaped in the form of a tube having a closed end and an open end terminating in a radially outwardly extending flange 32. The flange 32 is adapted to be disposed between the periphery of cover 14 and the mounting flange 24 of the vessel body in order to suspend the membrane 16 and its contents above a quantity of a second reactant 34. Advantageously, a disposable liner 36 is placed inside the vessel body to preserve the cleanliness of the interior thereof whereby to make recharging convenient and whereby to protect the reactant 34 from chemical contamination by the material of the vessel body. The liner 36 is fashioned in the form of a tubular film having a closed bottom and an open top terminating in a radially outwardly extending flange 38 which is disposed between the mounting flange 24 of the vessel body and the periphery of cover 14 in order to secure the liner 36 in place. The rupturable membrane 16 and the line 36 are selected to be of flexible, chemically inert, non-adherable, inexpensive resinous films, and films of such polyolefinic resins as polyethylene have proved eminently useful in this regard. If desired, a fibrous net which is attached to the cover 14 for example may enclose the membrane 16 to provide additional support for its contents.

In order to provide means for rupturing the membrane 16 whereby to release its contents to contact with the underlying reactant, a noose 40 which defines active means of flexible steel wire or other tensilely strong material encircles the membrane 16 and passes through a fitting 42 that is secured in the cover 14. A pull ring 44 which defines control means is attached to the outer end of the noose 40 so that the noose may be tightened to rupture the membrane 16 in the manner of a garrotte.

The dispensing unit 18 comprises a feed tube or conduit 46 which is mounted to the cover 14 by a fitting 48 that is formed in or attached to the cover 14. Conduit 46 has an open lower end 50 which is spaced above the floor 20 of the vessel body and which is disposed closely adjacent the floor. The feed tube 46 also has a laterally opening aperture 52 which is situated outside of the vessel body in alignment with a lateral bore 54 fashioned in the fitting 48. To facilitate dispensing of the foamed polymer which passes upwardly through the feed tube 46, a flexible hose or pipe 56 is joined to the fitting 48 at the lateral bore 54, and a nozzle 58 is fitted to the otherwise free end of the hose 56 for distribution and accurate placement of the polymeric foam. Advantageously, the nozzle 58 is of a type which is arranged to produce a fan-like spray or discharge. The feed tube 46 and the hose 56 are advantageously fabricated from inexpensive materials, such as polyethylene, polypropylene and vinyl resins, in order to permit their being discarded after a single using.

The lower end of feed tube 46 is desirably closed off by a rupturable, cup-like seal 60 which includes a thin membrane 61; and when the feed tube 46 and the seal 60 are fabricated from compatible resinous materials, the seal 60 may be secured in place by means of solvent or fusion welding. A piercing rod 62 passes downwardly through the feed tube 46, a control handle 64 being fastened at the upper end of the rod 62 and a blunted tip 66 being provided on the lower end, as is shown in FIG. 4. The rod 62 and particularly the tip 66 thereof are arranged to have a cross-sectional area that is substantially smaller than the area of the thin membrane 61. Cooperatively, the membrane 61 is specifically selected to be as thin as is consonant with its resisting rupture by pressures on the order of 300 p.s.i.g. within vessel body 12. This thinness of the membrane 61 causes it to tear or shred upon its being overstressed by force from the rod 62 while at the same time being exposed to a superatmospheric pressure from within the vessel body. Thus, the rod 62 cannot be used to close off the tube 46 and terminate flow once the membrane 61 has been ruptured.

Returning to FIG. 1, the rod 62 is seen to pass slidably through the upper end of the fitting 48 so as to dispose the handle 64 in convenient location. A conventional lock pin, not shown, is provided on the piercing rod 62 to hold the same in a position spaced from the seal 60 during handling and storage. A similar lock pin may be employed with the pull ring 44 if desired. The seal 60, by being rupturable, not only permits release of the reacting polymeric foam to the dispensing nozzle 58 but also serves as a safety valve should some accident result in the development of excessive pressure within the closed vessel body.

The two reactant 30 and 34 are selected to have a combined volume less than the total volume of the vessel body 12 in order to define a gas or headspace 68 for containing a gaseous blowing agent. In addition, means are provided for introducing additional gaseous materials into the headspace 68; and in the illustrated embodiment, these means comprise a fitting and check valve assembly 70. Considering FIG. 3, the assembly 70 includes an internally threaded bushing 72 having a pendant stem 74 which fits slidably into a bore 76 drilled in the cover 14. A bayonet member 78 has a mid-portion which is slidably disposed in a central bore fashioned in the bushing 72, bayonet member 78 being fabricated with a conical head 80 that acts both as a piercing element and as a stop for limiting downward movement of the member. The lower end of the piercing member 78 is externally threaded to be turned into an internally threaded bore formed in the stem end of a check valve element 82, the bulbous head of the check valve member cooperating with an elastomeric O-ring 84 in selectively sealing the interior of the vessel body from the external atmosphere. The laterally extending flange 32 of the membrane 16 is provided with a slot 86 or other appropriately shaped aperture in the region of the check valve member 82.

An auxiliary cartridge 88 is filled with a suitable gas and is provided with a threaded collar and a pierceable end adjacent the collar so that it may be threadedly assembled in sealable relationship to the bushing 72 and opened by the conical head 80 of the bayonet member 78. The mid-portion of the bayonet member and the lower shoulder of its head 80 are fashioned with grooves 90 for passing gas from the cartridge 88 to the interior of the vessel body 12. Cooperatively, the upstanding stem portion of the check valve member 82 is sized to define an annular passageway about its periphery inside the walls of the bore 76.

In the case wherein a polyurethane foam is to be dispensed by the device 10, a pre-determined quantity of an isocyanate resin is placed in the container formed by the membrane 16 whereby to serve as the reactant 30. Correspondingly, an hydroxyl-rich resin together with a selected catalyst, surfactants and other ingredients, such as foam stabilizers, are placed in the bottom of the vessel body underlying the membrane 16. All or some part of the blowing agent is filled into the headspace 68.

Representative isocyanate resins include the diisocyanates and polyisocyanates. Specific materials include the aromatic diisocyanates such as 2,4-tolylene diisocyanate, polymethylene diisocyanates such as tetramethylene diisocyanate, and mixed isocyanate-isothiocyanates such as 1-iso-cyanate, 6-isothiocyanate hexane. Representative polyisocyanates include toluene triisocyanate, triphenylmethane triisocyanate, and benzene triisocyanate. Preferred isocyanates are diphenylmethane diisocyanate and polymethylenepolyphenylisocyanate; and in compliance with an important feature of the invention, these preferred isocyanates are partially reacted with a substance having available hydroxyl groups before being filled into the container defined by membrane 16. Polyols such as glycerol, sucrose, sorbitol and 1,4-butanediol are preferred for this purpose. By forming the isocyanate as an adduct in this manner, it is possible to control both the viscosity of the reactant 30 and the viscosity of the product to be dispensed ultimately by the device 10; and it has been found that, by limiting the viscosity of these materials to no more than about 800 centipoises, reactants 30 and 34 can be adequately mixed merely by shaking the device 10 vigorously by hand. Moreover, by so limiting the viscosity of the reactant 30 and the mixture of reactants 30 and 34, the mixture can be readily dispensed through a nozzle and need not be troweled or scooped into place. Incorporation of the polyol in an amount of from about 5% to about 12% by weight of the isocyanate has been found to give a reactant having a suitable viscosity as defined hereinabove. Heat may also be employed to secure suitable viscosities at the time of mixing.

Representative hydroxyl-rich resins for the reactant 34 include the polyesters which are esterification products of a dicarboxylic acid and a polyhydric alcohol. Other representative hydroxyl-rich resins are the polyether polyols.

Suitable catalysts include combinations of tertiary amines and organotin compounds whereas a representative blowing agent is trichlorofluoromethane. In addition, water may be included in the reactant 34 to react with the isocyanate resin in reactant 30 to produce carbon dioxide which acts as a supplemental blowing agent. The auxiliary cartridge 88 may contain compressed carbon dioxide as a blowing agent or, alternatively, liquified dichloro-difluoromethane. Fluorocarbon type blowing agents are advantageously employed when a high insulation value (K factor) is desired in the finished foam; and in compliance with another feature of the invention, a fluorocarbon material which is a gas at normal atmospheric pressures and which can be readily liquified by refrigeration or superatmospheric pressure is employed to obtain prefoaming of the resinous froth as it is released through nozzle 58 whereby to prevent dispensing a watery or runny product. Dichloro-difluoromethane has proved eminently useful in this regard when incorporated at a level of about 4–6% by weight of the total foam system comprising reactants 30 and 34 and the blowing agent. An amount of dichloro-difluoromethane in excess of this amount is usefully employed in order to expel the reacting resinous mass from the vessel body 12.

In compliance with the features of the invention, the several reactants are introduced into the dispenser device 10 in pre-weighed quantities selected to produce the desired physical properties in the reacting mixture and in the polymer produced by their inter-reaction as determined by prior laboratory investigation of optimum mol ratios. Because of this accurately pre-determined amount of the reactants involved, only simple mixing is required to produce maximum results, there being no need to rely on the control of orifices in a mixing nozzle to produce a desired blend of the reactants. Moreover, a desirable prolonging of the contact between the reactants is produced prior to their being dispensed in place.

So that the present invention can be more thoroughly understood, a functional description of the mode in which the dispenser device 10 operates will now be given.

Dispenser device 10 will first be arranged, as has been described, with fresh units of the disposable components placed in proper position, including the liner 36, the feed tube 46 with seal 60, and the hose 56 with nozzle 58. Next, an hydroxyl-rich resin such as a polyether polyol displaying a hydroxyl range of from about one hundred to about six hundred will be filled into the vessel body 12 inside the liner 36, together with suitable catalysts and adjuncts. Correspondingly, the container-shaped membrane 16 will be filled with an isocyanate resin, such as diphenylmethane diisocyanate, having an —NCO range of from about twenty to about fifty. As will be recognized, the hydroxyl-rich resin and its associated ingredients define the reactant 34 whereas the isocyanate resin forms the reactant 30. When used in a ratio of from about 10/100 to about 100/10, the hydroxyl-rich resin and the isocyanate resin will have individually and initially when first mixed a viscosity of not more than about 800 centipoises, thus satisfying the requirements of the invention in this regard. To complete the charge of the dispenser device 10, a fluid blowing agent will be filled into the headspace 68 and the cover 14 will be clamped tightly unto the vessel body to form an hermetic seal. For convenience in filling the blowing agent, it may be poured over the reactant 34 in a refrigerated and liquified state prior to closing of the dispenser device. Alternatively, it may be filled in a gaseous form under pressure through the fitting and check valve assembly 70. A blowing agent such as trichlorofluoromethane, which is a liquid at room temperature and atmospheric pressure but which is readily gasified by the heat evolved upon reaction of the hydroxyl-rich resin and the isocyanate resin, may be readily mixed as an ingredient in the reactant 34 and charged into the dispenser device therewith. Before closing of the cover 14, the noose 40 will have been arranged as described, as will be the piercing rod 62. The dispenser device may be stored and handled in this condition until it is ready for use.

When it is desired to dispense a polymeric foam from the device 10, the auxiliary cartridge 88 will be assembled to the bushing 72 and forcibly turned down so that the conical head 80 pierces the end wall of the cartridge whereby to admit the contained gas from the cartridge through the channels formed by the grooves 90 in the bayonet member 78, about the check valve member 82 and finally into the interior of the vessel body. Instead of using the auxiliary cartridge 88 as a source of expelling gas pressure, a blowing agent gas may be filled into the dispenser device, either as the initial charge or through the assembly 70, in an amount in excess of that required to achieve expansion of the reacting resin into a foam.

The pull ring 44 will then be grasped and pulled up smartly to constrict the noose 40 and rupture the membrane 16, any safety lock provided being of course first released. The dispenser device 10 will then be vigorously shaken by hand for approximately five to ten seconds to mix the reactants 30 and 34. The nozzle 58 will then be aimed at the surface to be coated while the handle 64 is grasped and urged down firmly to dispose the rod 68 in pressuring engagement with the membrane 61 of the seal 60 as is shown in FIG. 4. The pressure developed by the reacting resins will cooperate with this stress applied to the membrane 61 to cause a renting of the membrane 61 and a release of the resinous mass into the feed tube 46, expelling force for driving the resinous mass in a generally outward direction being provided by the excess blowing agent or the gas pressure provided by the contents of cartridge 88 as is the case. The reacting mixture passes up the feed tube 46 to the nozzle 58 under pressure, and manipulation of the nozzle 58 will be continued until no more of the reacting mixture is emanating therefrom.

It is contemplated that the mixture of reactants 30 and 34 will be dispensed in only an incipiently reacting condition whereby to insure safety in the use of the dispenser device 10 and the expelling of substantially all of its resinous contents. In order to prevent running or sagging of the dispensed mixture while the resins react and form a naturally viscous product, temporary viscosity is provided in the mixture of reactants 30 and 34 in their immediately dispensed state. As has been described hereinabove, an amount of dichloro-difluoromethane in excess of the amount needed as a blowing agent or an amount supplementary to some other blowing agent is utilized in this regard. An amount of about 4–6 percent by weight of the total foam system comprising the reacting resins and the blowing agent is sufficient to provide this temporary increase in viscosity and frothing of the resin as it is released to atmospheric pressure through the nozzle 58. When trichlorofluoromethane is used as the blowing agent, this amount of dichloro-difluoromethane will be filled into the headspace 68. As the reacting resins emerge from the nozzle 58, the accompanying sudden decrease in pressure will gasify the dichloro-difluoromethane whereby to foam the mixture while the resins react; and as the reacting resins generate heat, the trichlorofluoromethane will be vaporized and trapped as the reactants solidify.

To prepare the device 10 for re-use, it is only necessary to unbolt the cover, discarding the cartridge 88 and cleaning the area around the check valve 82. The liner 36 and the remnants of the membrane 16 are extracted and discarded as are the feed tube 46 and the flexible hose 56. The discarded parts are replaced, and fresh reactants 30 and 34 are then filled into the proper places in the dispenser device. Finally, the cover 14 is bolted back into place.

With a dispenser device of the dimensions described, that is, a vessel body 12 with a diameter of approximately three inches and a height of approximately ten inches, approximately two-and-one-half pounds or about one quart liquid measure of the reactants can be filled into the dispenser device. Such a reactant charge, in the case of a polyurethane foam, is capable of producing one-and-one-quarter cubic feet or about fifteen board feet of a finished foam having a density of approximately two pounds per cubic foot. This amount of the polymeric foam has proved to be sufficient for insulating a valve in an oil line, for example, or to produce a single large cast about an injured member for medical purposes. Other important uses include the caulking of underground mine stoppings and the patching of extensive foam applications. It is to be recognized that the device of the invention is readily portable into many places where it would be impossible to take bulky equipment using multiple hoses and requiring a source of compressed gas. The resultant convenience and ready availability of the polymeric foam will be apparent.

The specific examples herein shown and described are to be considered as being primarily illustrative. Various changes, beyond those described, will, no doubt occur to those skilled in the art; and such changes are to be understood as forming a part of this invention insofar as they fall within the spirit and scope of the appended claims.

The invention is claimed as follows:

1. In apparatus for use in dispensing a reacting mixture, the combination comprising: vessel means sized both to receive a quantity of a first and a second reactant and to define a gas space; membrane means inside said vessel means shaped to segregate said first and second reactants; membrane rupturing means including active means inside said vessel means and engageable with said membrane means and control means connected to said active means and extending exteriorly of said vessel means for operating said active means into rupturing engagement with said membrane means to release said reactants into contact with each other; and fitting means on said vessel means including a connection portion adapted sealably to receive an auxiliary vessel in communication with the primary vessel for introducing supplemental, compressed gas therein, said fitting means being disposed to admit said supplemental gas into said gas space outside of said membrane means, said fitting means further including piercing means situated penetratingly to engage an auxiliary vessel connected therewith.

2. In apparatus for use in dispensing a reacting mixture, the combination comprising: vessel means sized both to receive a quantity of a first and a second reactant and to define a gas space; membrane means inside said vessel means shaped to segregate said first and second reactants; membrane rupturing means including active means inside said vessel means and engageable with said membrane means and control means connected to said active means and extending exteriorly of said vessel means for operating said active means into rupturing engagement with said membrane to release said reactants into contact with each other; and fitting means on said vessel means including a connection portion adapted to receive an auxiliary vessel in communication with the primary vessel for introducing supplemental, compressed gas therein, said fitting means including a puncturing member for piercing a wall of said auxiliary vessel.

3. In apparatus for dispensing a foaming reacting mixture, the combination comprising: vessel means of pressure-resistant construction sized both to receive quantities of a first and a second reactant and to define a gas space; conduit means having a first aperture inside said vessel means and a second aperture outside said vessel means; a distributing nozzle; means connecting said nozzle to said second aperture; a cup-like seal hermetically mounted in said conduit means adjacent said first aperture; a reciprocable rupturing member aligned with said seal and arranged to be operable slidably into stressing engagement therewith for rupturing said seal and opening said conduit means selectively; membrane means inside said vessel means shaped in the form of a container to receive said first reactant and segregate said first and second reactants; and a membrane rupturing noose encircling said membrane means and having a portion extending exteriorly of said vessel means for constricting the noose into rupturing engagement with said membrane means to release said reactants into contact with each other.

4. In apparatus for dispensing a reacting mixture, the combination comprising: vessel means of pressure-resistant construction sized both to receive quantities of a first and a second reactant and to define a gas space; discharge means fixed to said vessel means for conducting the contents of said vessel means to the outside thereof; first membrane means hermetically mounted in said discharge means; a movable rupturing member aligned with said membrane means and arranged to be operable into stressing engagement therewith for rupturing said membrane means and opening said conduit means selectively; second membrane means inside said vessel means shaped in the form of a container to receive said first reactant and segregate said first and second reactants; and a flexible, tensilely strong, membrane rupturing member, including a loop engaging said second membrane means and having a portion extending exteriorly of said vessel means for drawing said loop into rupturing engagement with said second membrane means to release said first reactant into mixing contact with said second reactant.

5. In apparatus for dispensing a reacting mixture, the combination comprising: vessel means of pressure-resistant construction sized both to receive quantities of a first and a second reactant and to define a gas space; conduit means for conducting the contents of said vessel means to the outside thereof, including a first aperture inside said vessel means and a second aperture outside said vessel means; first membrane means sealed in said conduit means and defining the only closure of said conduit means; a reciprocable rupturing member aligned with said membrane means and arranged to be operable slidably into stressing engagement therewith for rupturing said membrane means and opening said conduit means selectively, said rupturing member cooperating with said conduit means to define a passageway to the exterior of said vessel means; second membrane means inside said vessel means shaped in the form of a container to receive said first reactant and segregate said first and second reactants; and a wirelike membrane-rupturing member engaging said second membrane means interiorly of said vessel means and having a portion extending exteriorly of said vessel means for use in drawing the interior portion into rupturing engagement with said second membrane means to release said first reactant into mixing contact with said second reactant.

References Cited by the Examiner

UNITED STATES PATENTS

| | | | |
|---|---|---|---|
| 1,056,451 | 2/1913 | Read | 222—5 X |
| 1,363,009 | 12/1920 | Pearsons | 169—32 |
| 1,795,513 | 3/1931 | Schmidt | 169—32 |
| 2,522,088 | 9/1950 | Bower | 169—32 |
| 2,889,078 | 6/1959 | Thomas | 222—80 |
| 2,971,576 | 2/1961 | Anker. | |
| 3,080,094 | 3/1963 | Modderno | 222—394 X |
| 3,088,586 | 5/1963 | Hardman. | |
| 3,178,157 | 4/1965 | Cole | 222—136 X |

FOREIGN PATENTS

| | | |
|---|---|---|
| 64,037 | 5/1955 | France. |

ROBERT B. REEVES, *Primary Examiner.*

RAPHAEL M. LUPO, *Examiner.*

N. L. STACK, *Assistant Examiner.*